June 10, 1930.  E. HIGGINS  1,762,624

FRICTION CLUTCH

Filed April 25, 1928

INVENTOR
Eugene Higgins
BY
ATTORNEYS

Patented June 10, 1930

1,762,624

UNITED STATES PATENT OFFICE

EUGENE HIGGINS, OF JACKSON, MICHIGAN

FRICTION CLUTCH

Application filed April 25, 1928. Serial No. 272,576.

The main objects of this invention are:

First, to provide an improved friction clutch of the expansion ring type which is very compact and at the same time is capable of transmitting heavy loads.

Second, to provide an improved friction clutch having these advantages which is simple in its parts and the parts are so formed and arranged that they are capable of withstanding the strains thereon without injury.

Objects relating to details and economies of my invention will appear from the detailed description to follow. The invention is defined and pointed out in the claims.

A structure which is a preferred embodiment of my invention is illustrated in the accompanying drawing, forming a part of this application, in which.

In the drawing similar reference characters refer to similar parts throughout the several views.

Figure 2:
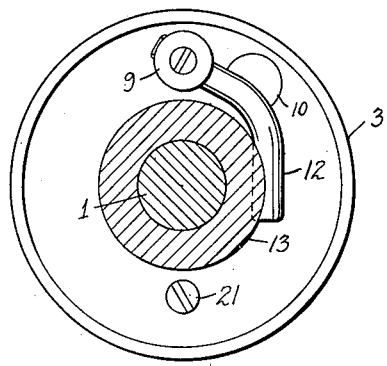
Fig. 2 is a transverse section on line 2—2 of Fig. 1.
Figure 1:
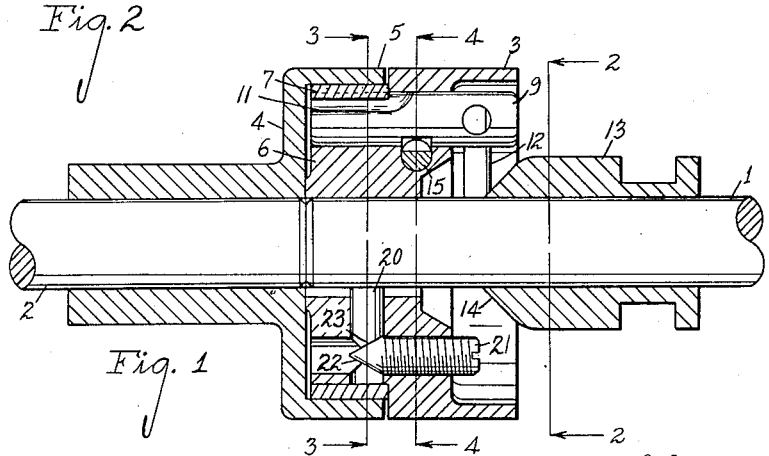
Fig. 1 is a longitudinal section of my improved clutch on a line corresponding to line 1—1 of Figs. 3 and 4, the shafts being shown in full lines and partially broken away.

In the embodiment illustrated, 1 represents a driving shaft and 2 the driven shaft. These shafts are arranged in alignment.

The driving clutch member 3 is shouldered while the driven clutch member 4 is provided with an annular flange 5 embracing the shouldered portion 6 of the driving clutch member and disposed concentrically relative thereto.

The clutch ring 7 is disposed to embrace the shouldered portion of the clutch member 3 and to be expanded into clutching engagement with the flange portion 5 of the clutch member 4.

The clutch member 3 has a pair of spaced longitudinal bores 8 therein disposed so that they cut through the periphery of the reduced or shouldered portion of the member.

Figure 3:
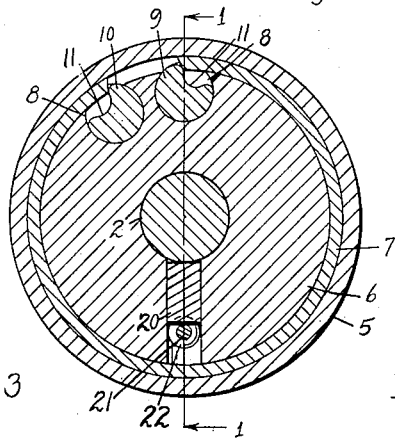
Fig. 3 is a transverse section on line 3—3 of Fig. 1.

The cylindrical abutment members 9 and 10 are rotatably mounted in these bores, these abutment members having radial shoulders 11 coacting with the ends of the clutch ring, as clearly shown in Fig. 3.

The member 9 is provided with an actuating arm 12 which projects inwardly into coacting relation with the collar 13 slidable on the shaft 1 and having a conical cam surface 14 coacting with the arm so that when the collar is moved inwardly, as by means of a shifting lever not illustrated, the abutment 9 is rotated, thereby actuating the clutch ring or forcing the clutch ring into clutching engagement with the flange 5.

Figure 4:
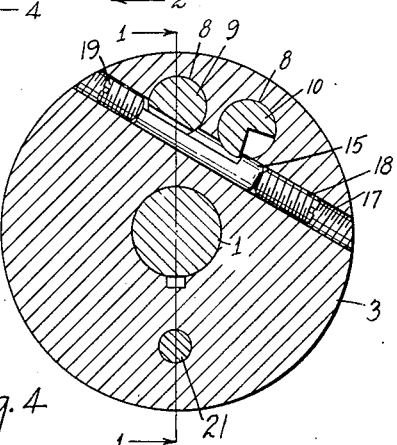
Fig. 4 is a transverse section on line 4—4 of Fig. 1.

The abutment member 10 is adjustably supported to receive the thrust of the clutch ring and to adjust and take up wear thereon by means of the shouldered pin 15 projecting into the bore 17 provided in the clutch member 3—see Fig. 4, this pin being adjustably supported by the screws 18 and 19 threaded into the ends of the bore. This provides for very accurate adjustment in assembling and also to compensate for wear.

In the embodiment illustrated, the driving clutch member is secured to the shaft by means of the radially disposed key 20 which is forced into and held in locking engagement with the shaft by means of the screw 21 having a tapered eye 22 coacting with the inclined end 23 of the key.

My improved clutch may be made in very compact form and at the same time is capable of transmitting heavy loads.

A further advantage is that there are no projecting parts and the parts are so arranged that the strain thereon is minimized.

Having thus described my invention, what I claim as new and desire to secure by Letters Patent, is:

1. In a friction clutch, the combination of driving and driven shafts disposed in alignment, an externally shouldered driving clutch member secured to said driving shaft, a driven clutch member secured to said driven shaft and provided with an annular flange embracing the shoulder portion of said driving clutch member, a split clutch ring embracing said shoulder portion of said driving clutch member to coact with the flange of said driven clutch member, said driving clutch member having spaced parallel longitudinal bores cutting through the periphery of its said shoulder portion, cylindrical abutment members rotatably mounted in said bores and having radial shoulders coacting with the ends of said clutch ring, one of said abutment members being provided with an actuating arm at its outer end, an actuating cam slidably mounted on said driving shaft to coact with said arm, and a screw means for rotatably adjusting and supporting the other abutment member.

2. In a friction clutch, the combination of driving and driven shafts disposed in alignment, an externally shouldered driving clutch member secured to said driving shaft, a driven clutch member secured to said driven shaft and provided with an annular flange embracing the shoulder portion of said driving clutch member, a split clutch ring embracing said shoulder portion of said driving clutch member to coact with the flange of said driven clutch member, said driving clutch member having spaced parallel longitudinal bores cutting through the periphery of its said shoulder portion, abutment members rotatable mounted in said bores and having radial shoulders coacting with the ends of said clutch ring, one of said abutment members being provided with an actuating arm at its outer end, and means for rotatably adjusting and supporting the other abutment member.

3. In a friction clutch, the combination of an externally shouldered inner clutch member, an outer clutch member provided with an annular flange embracing the shoulder portion of said inner clutch member, a split clutch ring embracing said shoulder portion of said inner clutch member to coact with the flange of said outer clutch member, said inner clutch member having spaced parallel longitudinal bores cutting through the periphery of its said shoulder portion, clutch abutment members rotatably mounted in said bores and having shoulders coacting with the ends of said clutch ring, one of said abutment members being provided with an actuating arm at its outer end, and a means for rotatably adjusting and supporting the other abutment member.

4. In a friction clutch, the combination of concentrically disposed inner and outer clutch members, a split clutch ring disposed between said members, the inner member having parallel longitudinal bores therein cutting through the periphery of a portion thereof, cylindrical abutment members rotatably mounted in said bores and having radial shoulders coacting with the ends of said clutch ring, one of said abutment members being provided with an actuating arm, and a screw means for rotatably adjusting and supporting the other abutment member in its adjusted position.

5. In a friction clutch, the combination of concentrically disposed inner and outer clutch members, said inner clutch member having parallel longitudinal bores therein cutting through a portion of its periphery, a split clutch ring disposed between said members, cylindrical abutment members rotatably mounted in the inner member and having radial shoulders coacting with the ends of said clutch ring, one of said abutment members being provided with an actuating arm, and a screw means for rotatably adjusting and supporting the other abutment member in its adjusted position.

In witness whereof I have hereunto set my hand.

EUGENE HIGGINS.